June 2, 1970 R. N. NEALIS 3,515,146
AROMATIC FILTER
Filed June 27, 1967 2 Sheets-Sheet 1
FIG. 1
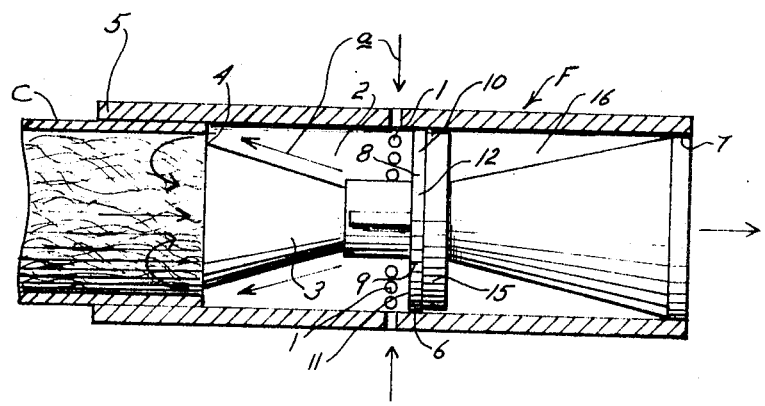
FIG. 2
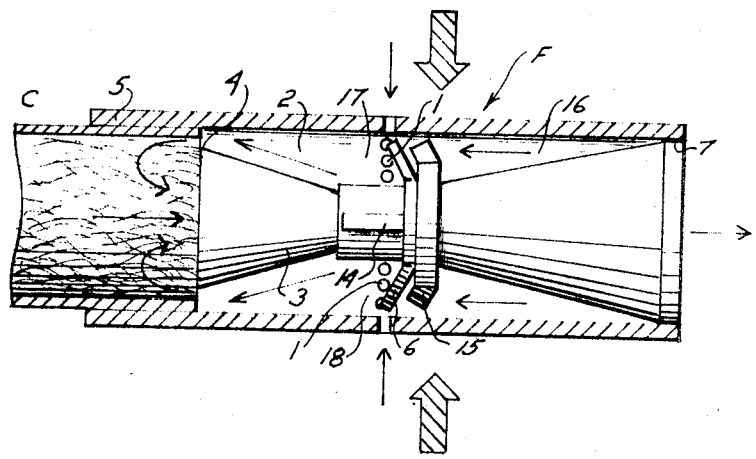
FIG. 3
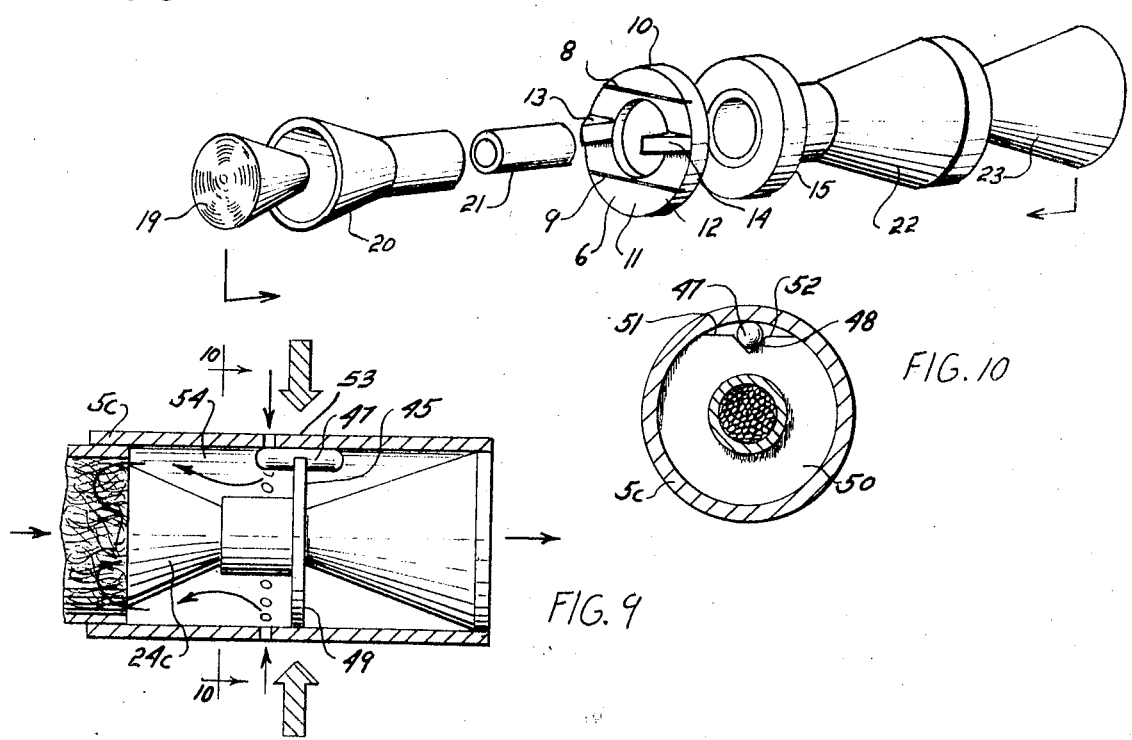
FIG. 9
FIG. 10

June 2, 1970   R. N. NEALIS   3,515,146
AROMATIC FILTER
Filed June 27, 1967   2 Sheets-Sheet 2

United States Patent Office 3,515,146
Patented June 2, 1970

3,515,146
AROMATIC FILTER
Raymond N. Nealis, 11 Harvest Road,
Levittown, Pa. 19056
Filed June 27, 1967, Ser. No. 649,289
Int. Cl. A24d 1/06; A24f 7/04
U.S. Cl. 131—10.1                    5 Claims

ABSTRACT OF THE DISCLOSURE

The invention relates to a filter for cigarettes and cigars which enables the same to be smoked under aromatic or non-aromatic conditions, the aromatic condition being obtained by simply squeezing the filter element between the fingers, the effect of which is to fracture a chamber containing the aromatic and thereby releasing the same to mix with the smoke.

---

This invention relates to filters particularly adapted for use in connection with cigars and cigarettes, the filter being arranged so that it is selectively usable under either aromatic or non-aromatic conditions.

The principal object of the invention is to provide a filter which permits a cigar or a cigarette to be smoked under non-aromatic conditions or alternatively under aromatic conditions simply by squeezing or compressing the filter tip between the fingers and thereby releasing the aromatic for mixture with the smoke.

For the above objective the invention in one aspect contemplates a filter having an air-tight chamber containing the aromatic, the chamber having a structural portion deformable or destructible by means of pressure exerted by the fingers squeezing the filter housing, the fracture of the chamber permitting the release of the aromatic.

In furtherance of the objective the invention contemplates a filter having an element supporting a capsule of liquid aromatic, the element and the capsule being fractured by means of pressure exerted by the fingers squeezing the filter housing, the deforming of the element rupturing the capsule and thereby releasing the aromatic.

A preferred form of the invention will be explained below in connection with the following drawings wherein:

FIG. 1 is a sectional elevational view showing a filter constructed in accordance with the invention and being in non-aromatic smoking condition;

FIG. 2 is a sectional elevational view showing the filter of FIG. 1 in aromatic smoking condition;

FIG. 3 is an exploded view of the filter device of FIG. 1.

FIG. 9 is a sectional elevational view showing a further modified form of the invention; and FIG. 10 is a view taken along the lines of 10—10 in FIG. 9.

Figure 4:
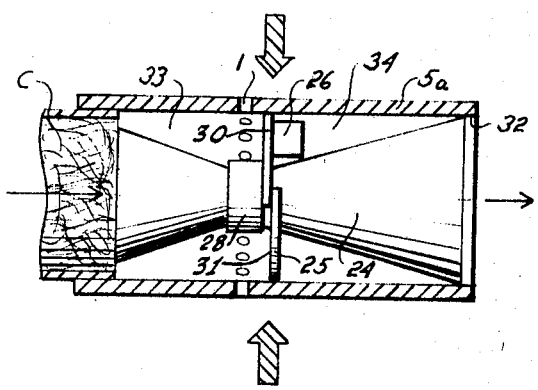
FIG. 4 is a sectional elevational view of another embodiment of the filter of the invention, the filter being in non-aromatic condition.

In FIG. 1 a filter F mounts a tobacco burning article such as the cigarette C for smoking non-aromatic conditions.

The arrows A indicate air streams moving radially through a plurality of first passageways 1 into a chamber 2, then reversing direction to move axially over a spool-like structure 3 through exit 4, then reversing direction in the tobacco to mix with smoke stream and pass through the spool-like structure 3 which contains filtering elements and filtering material prior to entering the smoker's mouth as described in my copending application SN 630,902, filed April 14, 1967, now abandoned.

The filter comprises a cylindrically shaped housing 5 within which is contained a spool-like structure 3, adhesively engaged to and supported by a disk-like partition wall 6, adhesively engaged to the inner surface of the housing 5. The structure 3 is also adhesively engaged with the housing 5 at 7.

The left hand face of the wall 6 (as viewed in FIG. 1) is scored and indented preferably on two parallel lines 8 and 9, defining two minor quadrants 10 and 11 spaced by a support section 12, positioned perpendicular to structure 3 by reinforcing abutments 13 and 14 more clearly shown in FIG. 3.

A fibrous material 15 within a chamber 16 is saturated with a concentrate of an aromatic substance, such as menthol, and is mounted against the right hand face of wall 6 (as viewed in FIG. 1). Before going on, it is pointed out that the chamber 2 is formed by the housing 5 and the wall 6; and that the spool-like structure 3 is located centrally in the chamber. On the right hand side (as viewed in FIG. 1), the chamber 16 is formed by the housing 5, the wall 6 and the spool-like structure 3. The chamber 16 is air-tight so as to retain the aromatic gases.

To release the aromatic for mixing with the smoke the invention contemplates that a deformation of the wall 6 will occur so that the chambers 2 and 16 are in communication and the aromatic is free to move into or be drawn into the air stream A.

To release the aromatic, the filter is held with the thumb and forefinger, the contact being made slightly to the right of the aperture 1 (as viewed in FIG. 1), and then pressure is exerted to compress the housing. The housing is made of a plastic material so that after compression, the housing will spring back to its original shape.

The pressure is exerted radially inward of the quadrants 10 and 11 and to insure proper alignment of the fingers with the disk the outside of the housing is suitably marked.

The inward compression of the housing 5 causes the wall 6 to deform along the lines 8 and 9, in FIG. 3, so that the quadrants 10 and 11 bend and become disengaged and unsealed from the housing 5 as shown in FIG. 2. The quadrants remain in the bent condition when the pressure is released placing chambers 2 and 16 into communication.

The aromatic gases expand into the chamber for mixture with air streams A. However, the gas movement may be enhanced by th above structure as noted following.

In FIG. 2, air entering through certain apertures 1 is biased between chamber 2 and unsealed chamber 16, mixing with the aromatic of fibrous material 15. Air entering unbiased apertures 1 in a radial direction; and thence, in an axially direction is increased in velocity particularly in the areas 17 and 18 which has the effect of siphoning the mixture from the chamber 16 causing the same to be intimately mixed with the air stream in chamber 2, through exit 4 into tobacco where it turns radially, flows axially through the filter, and into the smoker's mouth.

The spool-like structure 3 of FIG. 1 is shown in detail in FIG. 3 and comprises a left hand cellulose element 19 nesting in the left hand conical structure 20, which telescopes over a cartridge of filter material 21, impales the wall 6, telescopes into the right hand conical structure 22, which slidably supports the fibrous material 15 and contains the right hand cellulose element 23.

FIG. 4 shows a modified form of the filter which includes a housing 5a within which is adhesively contained an alternate spool structure 24, a segmented partition wall 25 which mounts an alternate aromatic fibrous material 26.

Figure 5:
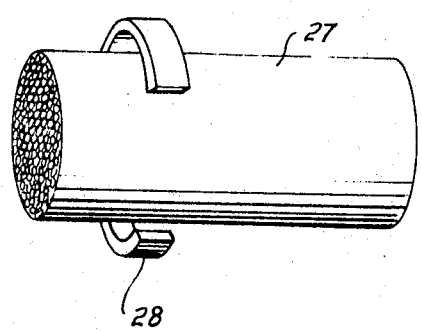
FIG. 5 is a perspective view of two of the components of FIG. 4 prior to assembly.

FIG. 5 shows a method of forming a basic spool structur 24 by encircling a cellulose element cartridge 27 with a plastic band 28. Reductive encirclement compression of the band 28 forms a spool structure 24, FIG. 4, with end diameters greater than the central diameter.

Variance of end diameters is obtained by off-center positioning of the band 28 on cartridge 27. The reduced central diameter, serially reduces the volume of free air passages within the cellulose element cartridge 27 from either end toward the band 28. Air entering from either end will undergo a velocity and pressure change as it approaches the banded throat. This Venturi-like spool structure 24 is surface sealed by spraying a liquid, contact sensitive, adhesive on all but the end surfaces, to develop an outer skin surface 29 in FIG. 4.

Figure 6:
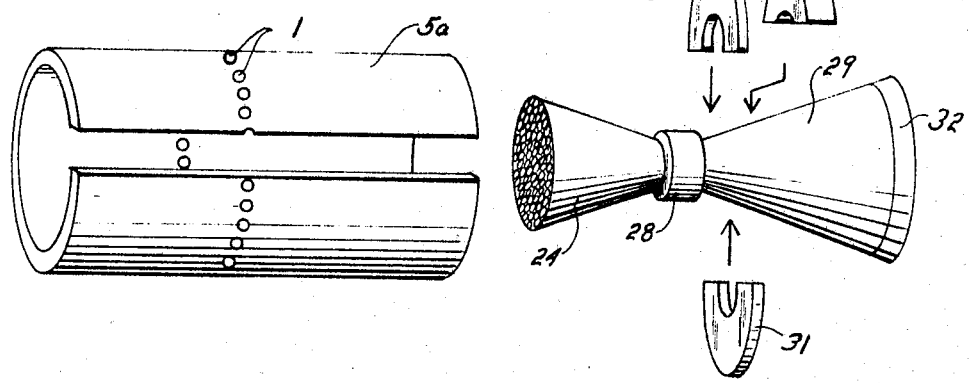
FIG. 6 is an exploded view of certain of the components of the filter of FIG. 4.

FIG. 6 shows a pattern of assembly of the filter structure assembled in FIG. 4.

In FIG. 6 a disk-like segmented partition wall 25 (FIG. 4) is formed by adhesively securing wall segments 30 and 31 in overlapping engagement around the spool structure 24, immediately to the right hand side of band 28. Alternate aromtic fibrous material 26 is positioned immediately to the right of wall segment 30.

In FIG. 6, the cylindrical housing 5a is formed as a wrapping around the spool structure 24, providing an overhanging portion to support the tobacco burning article C in the left hand end. The housing 5a has a plurality of apertures 1 and is spray coated on the inner surface with a liquid, contact sensitive, adhesive, as are the segments 30 and 31 of the wall 25. As the cylindrical housing 5a is wrapped around the spool structure 24, the contact sensitive, adhesive coated inner surface engages the outer periphery of the wall 25 and the right hand end 32 of the spool structure 24.

As will be apparent from the foregoing, the filter, in FIG. 4, has a chamber 33 which functions similarly as the chamber 2 of FIG. 1, together with an air-tight chamber 34, within which is mounted the aromatic fibrous material 26. The chamber 33 and 34 are put in communication by the deformation or fracture of the wall 25.

External finger pressure indicated by shaded arrows, FIG. 4, fractures the overlapped seal and the peripheral seal of the wall 25. Chamber 34 containing aromatic fibrous material 26, opened to chamber 33 allows aromatic permeation of the smoke stream by convection.

Figure 7:
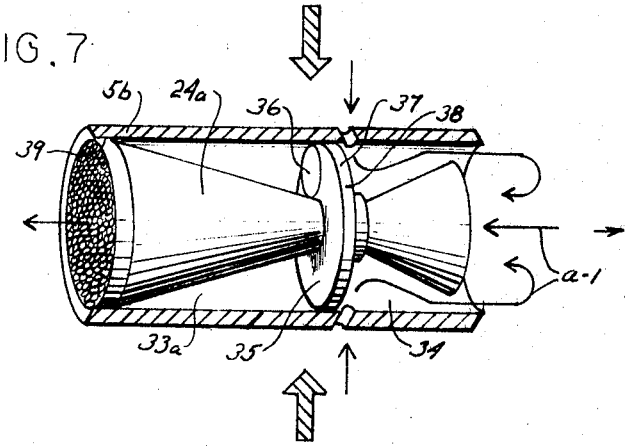
FIG. 7 is a perspective view with certain parts broken away of a modified filter construction.

Another embodiment of the invention is shown in FIG. 7, wherein the fibrous deformable partition wall 35 mounts a ruptureable capsule 36, which contains the aromatic and is ruptured when the wall 6 is deformed, releasing the aromatic.

The partition wall 35 has at least one deformable quadrant 37, defined by an indented line 38 on the right hand face. The left hand face of the wall 35 mounts a ruptureable capsule 36 contaiing a liquid concentrate of an aromatic substance.

Capsule 36 is vertically positioned to span across the line 38.

Deformation bending of the wall 35 by external finger pressure, (shaded arrows) exerted on housing 5b ruptures capsule 36 saturating wall 35 and permeating the air in the chambers 33a and 34a with the aromatic, which is then siphoned into the smoke stream before it enters the filter enroute to the smoker's mouth.

In this concept of the filter of FIG. 7, an air-tight seal between the spool structure structure 24a and the housing 5b is only required at the adhesive jointure 39 on the left hand end. In all concepts, the tobacco burning article, such as the cigarette C, is preferably adhesively air sealed to the supporting end of the housing.

Except in the concept providing a ruptureable capsule of aromatic, the surface of the material forming the aromatic air-tight chambers are preferably non-porous to provide and insure longer shelf-life of the aromatic and prevent undesired permeation of the tobacco by the aromatic.

Figure 8:
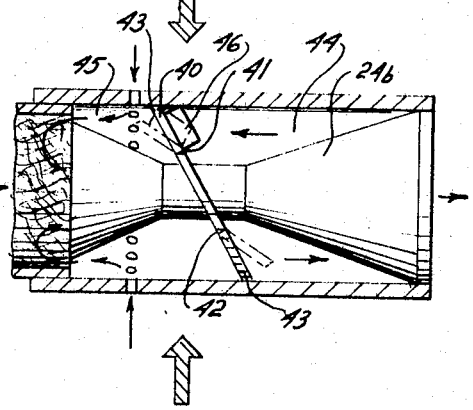
FIG. 8 is a sectional elevational view showing a modified embodiment of the invention.

FIG. 8 shows another embodiment of the invention wherein the partition wall 40 is positioned at an angle with respect to an alternate spool structure 24b. The wall 40 is indented on opposite faces along the lines 41 and 42. The angle position of the wall 40 more easily facilitates deforming along the lines 41 and 42, and fracture of air seal jointures at 43. With such deformation the chambers 44 and 45 are in communication and the aromatic in material 46 is released.

In FIG. 9, the capsule 47 is horizontally disposed in a notch 48, formed in the peripheral surface 49 of the disklike partition wall 50 which has flat surfaces 51 and 52 extending out from both sides of the notch. The side wall of the capsule 47 engages with the inner surface of the housing 5c. Finger pressure at a marked location 53 on the housing 5c deforms it and bends ends of capsule 47 down over the notch 48 in the wall 50 severing the side wall of the capsule.

The above pressure causes the notch 48 to sever the wall of the capsule 47, releasing an aromatic liquid from the capsule 47. The aromatic permeates the chamber 54 and is siphoned into the smoke stream in the tobacco before it enters and passes through the spool structure 24c, into the smoker's mouth.

Improvements provided by the invention in cooling and filtration of smoke are identical to those described in copending patent application No. 630,902.

It is further apparent that an aromatic, providing a pseudo-scent of tobacco under combustion, can be employed in the invention to scent the smoke from a less toxic burning article other than one of tobacco.

It is further understood that the invention can be used to filter impurities from any smoke stream while simultaneously providing a means to introduce a purifying and toxicity reducing agent into that smoke stream. Reduction of the air pollution level of the toxic chemical elements present in any smoke can be reduced or diluted without impairing the velocity of the smoke exhaust from the filter.

As an example, pure oxygen can be siphoned into the filter by a smoke stream draft, to dilute the toxic level of the exhausted smoke.

I claim:
1. A filter for a tobacco burning article such as a cigarette or cigar to permit the same to be smoked under aromatic or non-aromatic conditions comprising;
   an elongated housing inwardly compressible under pressure developed by squeezing the same between the fingertips;
   a material impregnated with a concentrate of an aromatic substance within said housing;
   means cooperating with said housing and forming an airtight chamber containing said material; and
   said means including a disc deformable under pressure developed by the inward compression of said housing, the disc having at least one indented line to weaken the disc and thereby permit deformation and the disc, when deformed, opening said chamber to permit escape of the aromatic for mixture with the smoke.

2. A construction in accordance with claim 1 wherein said disk is tilted with respect to the axis of the housing.

3. A filter for a tobacco burning article such as a cigarette or cigar to permit the same to be smoked under aromatic or non-aromatic conditions comprising;
   a filter element made of material permitting flow of smoke through the element, the element having an entrance end providing for the entrance of said smoke into the element and also having an exit end providing for the exit of said smoke from the element, the cross section of the element decreasing in a direction from the entrance end to the exit end for increasing the velocity of the smoke through the element;
   means including a disc surrounding said filter element and forming a first hollow chamber around the element, the disk having at least one indented line to weaken the disk and thereby permit deformation;

mechanism connected with said means for mounting a tobacco burning article whereby the tobacco is in abutting relationship with said entrance end;

said means being formed with a mounting section adjacent said exit adapting the filter to be placed in the mouth of a smoker and cooperating with said disk to form a second hollow chamber;

a material impregnated with a concentrate of an aromatic substance in said second chamber, the deformation of said disk opening said second chamber and providing for the aromatic to be in communication with said first chamber;

said means also being formed with a plurality of apertures adjacent to and disposed around said exit end and forming first passageways communicating the outside air with said first hollow chamber and said means being formed with an aperture adjacent to and disposed around said entrance end and forming second passageways communicating said first hollow chamber with said tobacco burning element; and said structure providing for air to enter said first passageways generally radially and then change direction and flow axially through said first chamber over the filter element and out said second passageways into and then change direction and flow through the tobacco and thence into the entrance end of said element said change in direction increasing the velocity of the air.

4. A filter for a tobacco burning article such as a cigarette or cigar to permit the same to be smoked under aromatic or non-aromatic conditions comprising;

a filter element made of material permitting flow of smoke through the element, the element having an entrance end providing for the entrance of said smoking into the element and also having an exit end providing for the exit of said smoke from the element;

means including a disc surrounding said filter element and forming a first hollow chamber around the element, the disc having at least one indented line to weaken the disc and there permit deformation;

mechanism connected with said means for mounting a tobacco burning article whereby the tobacco is in abutting relationship with said entrance end;

said means being formed with a mounting section adjacent said exit adapting the filter to be placed in the mouth of a smoker and cooperating with said disc to form a second hollow chamber;

a material impregnated with a concentrate of an aromatic substance in said second chamber, the deformation of said disc opening said second chamber and providing for the aromatic to be in communication with said first chamber;

said means also being formed with a plurality of apertures adjacent to and disposed around said exit end and forming first passageways communicating the outside air with said first hollow chamber and said means being formed with an aperture adjacent to and disposed around said entrance end and forming second passageways communicating said first hollow chamber with said tobacco burning element; and said structure providing for air to enter said first passageways generally radially and then change direction and flow axially through said first chamber over the filter element and out said second passageways into and then change direction and flow through the tobacco and thence into the entrance end of said element said changes in direction increasing the velocity of the air.

5. A filter for a tobacco burning article such as a cigarette or cigar to permit the same to be smoked under aromatic or non-aromatic conditions comprising;

a filter element made of material permitting flow of smoke through the element, the element having an entrance end providing for the entrance of said smoke into the element and also having an exit end providing for the exit of said smoke from the element, the cross section of the element decreasing in a direction from the entrance end to the exit end for increasing the velocity of the smoke flowing through the element;

means including a disk surrounding said filter element and forming a first hollow chamber around the element, the disk having at least one indented line to weaken the disk and thereby permit deformation;

mechanism connected with said means for mounting a tobacco burning article whereby the tobacco is in abutting relationship with said entrance end;

said means being formed with a mounting section adjacent said exit adapting the filter to be placed in the mouth of a smoker and cooperating with said disk to form a second hollow chamber;

a material impregnated with a concentrate of an aromatic substance in said second chamber, the deformation of said disk opening said second chamber and providing for the aromatic to be in communication with said first chamber;

said means also being formed with a plurality of apertures adjacent to and disposed around said exit end and forming first passageways communicating the outside air with said first hollow chamber and said means being formed with an aperture adjacent to and disposed around said entrance end and forming second passageways communicating said first hollow chamber with said tobacco burning element and the cross section of said hollow chamber decreasing in a direction from the exit end to the entrance end for increasing the velocity of the air flowing through the chamber; and said structure providing the air to enter said first passageways generally radially and then change direction and flow axially through said first chamber over the filter element and out said second passageways into and then change direction and flow through the tobacco and thence into the entrance end of said element, said change in direction increasing the velocity of the air.

References Cited

UNITED STATES PATENTS

| 2,755,206 | 7/1956 | Statia | 131—10.1 |
| 2,893,399 | 7/1959 | Jacoby | 131—10.1 |
| 2,949,116 | 8/1960 | Balkind | 131—10 |
| 3,339,558 | 9/1967 | Waterbury | 131—10.1 |

OTHER REFERENCES

Puchert M.: Germany Das 1,077,127, published Mar. 3, 1960, 131—10.1.

LUCIE H. LAUDENSLAGER, Primary Examiner

U.S. Cl. X.R.

131—10.7, 10.9, 202, 261